US012034796B2

(12) United States Patent
Procopio et al.

(10) Patent No.: US 12,034,796 B2
(45) Date of Patent: Jul. 9, 2024

(54) SYSTEMS AND METHODS FOR NOTIFYING USERS OF CHANGES TO FILES IN CLOUD-BASED FILE-STORAGE SYSTEMS

(71) Applicant: Google LLC, Mountain View, CA (US)

(72) Inventors: Michael Jeffrey Procopio, Boulder, CO (US); John Herndon, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/582,673

(22) Filed: Jan. 24, 2022

(65) Prior Publication Data
US 2022/0224750 A1    Jul. 14, 2022

Related U.S. Application Data

(63) Continuation of application No. 16/512,352, filed on Jul. 15, 2019, now Pat. No. 11,258,842, which is a (Continued)

(51) Int. Cl.
*G06F 3/04842*  (2022.01)
*G06F 16/17*  (2019.01)
(Continued)

(52) U.S. Cl.
CPC .......... *H04L 67/06* (2013.01); *G06F 3/04842* (2013.01); *G06F 16/1734* (2019.01); *H04L 67/10* (2013.01)

(58) Field of Classification Search
None
See application file for complete search history.

(56) References Cited

U.S. PATENT DOCUMENTS 6,438,564 B1 *  8/2002  Morton ................. G06F 40/169
                                                                    715/255
8,640,257 B1 *  1/2014  Sherrets ................. G06Q 99/00
                                                                    726/28
(Continued)

FOREIGN PATENT DOCUMENTS

CN        101315621 A      12/2008
CN        101888620 A      11/2010
(Continued)

OTHER PUBLICATIONS

Chinese Patent Application No. 201680018865.8 Office Action dated Mar. 31, 2020, 24 pages.
(Continued)

*Primary Examiner* — Tuyetlien T Tran
(74) *Attorney, Agent, or Firm* — Lowenstein Sandler LLP

(57) ABSTRACT

A method to provide a service to facilitate notifications of changes to a plurality of files located in a plurality of folders in a cloud-based storage system includes exposing an application programming interface (API) to obtain subscription data for a plurality of users of a plurality of client devices, receiving, via the API, subscription data from a first client device of the plurality of client devices, the subscription data associated with a user account of a first user of the plurality of users and identifying a folder subscribed by the first user to receive notifications of changes to one or more files located in the folder; storing, in a data store, the subscription data associated with the user account of the first user, the subscription data comprising an identifier of the folder to be monitored for changes to the one or more files for the user account of the first user of the first client device, and providing, to the first client device, updates pertaining to the changes to the one or more files to cause the first user to be notified about the changes to the one or more files, wherein the updates are provided in accordance with the subscription (Continued)

data associated with the user account of the first user, and wherein the changes comprise changes made to the one or more file by users other than the first user.

20 Claims, 8 Drawing Sheets

Related U.S. Application Data continuation of application No. 14/688,848, filed on Apr. 16, 2015, now Pat. No. 10,356,157.

(51) Int. Cl.
*H04L 67/06* (2022.01)
*H04L 67/10* (2022.01)

(56) References Cited

U.S. PATENT DOCUMENTS

| | | | |
|---|---|---|---|
| 2003/0172368 A1* | 9/2003 | Alumbaugh | G06F 8/71 717/106 |
| 2004/0003352 A1* | 1/2004 | Bargeron | G06F 16/9535 715/255 |
| 2007/0050392 A1* | 3/2007 | Shukla | G06F 16/2358 707/999.102 |
| 2007/0198677 A1* | 8/2007 | Ozhan | G06Q 10/107 709/223 |
| 2007/0282959 A1* | 12/2007 | Stern | G06Q 30/02 709/206 |
| 2008/0065604 A1* | 3/2008 | Tiu | G06F 16/258 |
| 2008/0065701 A1* | 3/2008 | Lindstrom | G06F 16/258 |
| 2008/0243831 A1* | 10/2008 | Kunitake | G06F 16/33 707/999.005 |
| 2009/0049053 A1* | 2/2009 | Barker | G06F 16/2308 |
| 2009/0134982 A1* | 5/2009 | Robertson | G08B 27/005 340/326 |
| 2009/0172085 A1* | 7/2009 | Arthursson | H04L 67/02 707/610 |
| 2009/0210454 A1* | 8/2009 | Sagar | G06F 16/184 |
| 2012/0278401 A1* | 11/2012 | Meisels | H04L 51/234 709/206 |
| 2012/0284344 A1* | 11/2012 | Costenaro | G06F 40/169 709/206 |
| 2013/0031487 A1 | 1/2013 | Olsen et al. | |
| 2013/0041747 A1* | 2/2013 | Anderson | H04N 21/8133 715/733 |
| 2013/0073449 A1* | 3/2013 | Voynow | G06Q 30/0601 709/217 |
| 2013/0155440 A1* | 6/2013 | Yoshida | H04N 1/00214 358/1.13 |
| 2013/0185252 A1* | 7/2013 | Palmucci | G06F 16/93 707/608 |
| 2013/0212250 A1* | 8/2013 | Kleppner | H04L 67/06 709/224 |
| 2013/0254699 A1* | 9/2013 | Bashir | G06F 3/0481 715/772 |
| 2014/0059217 A1* | 2/2014 | Pizurica | H04L 43/08 709/224 |
| 2014/0129661 A1* | 5/2014 | Thyagaraja | H04L 51/224 709/207 |
| 2014/0281870 A1 | 9/2014 | Vogel et al. | |
| 2014/0325629 A1 | 10/2014 | Wertz | |
| 2014/0359069 A1 | 12/2014 | Matute | |
| 2014/0359465 A1* | 12/2014 | Litan Sever | G06F 3/04817 715/738 |
| 2014/0379648 A1* | 12/2014 | Chiu | G06F 16/113 707/624 |
| 2015/0186660 A1* | 7/2015 | Sherrets | G06F 21/606 726/30 |
| 2015/0277807 A1* | 10/2015 | Okazaki | G06F 3/1205 358/1.15 |
| 2015/0304265 A1* | 10/2015 | Vincent | H04L 51/52 709/206 |
| 2016/0070741 A1* | 3/2016 | Lin | G06F 16/183 707/638 |

FOREIGN PATENT DOCUMENTS

| | | |
|---|---|---|
| CN | 102077163 A | 5/2011 |
| CN | 103503020 A | 1/2014 |
| EP | 2698016 A1 | 2/2014 |
| WO | 2015006718 A1 | 1/2015 |

OTHER PUBLICATIONS

International Search Report and Written Opinion for PCT/US2016/027926 dated Jul. 20, 2016.
James Anthony, "blogs.dropbox.com/dropbox/2014/09/do-more-on-the-go-with-a-new-dropboxfor-ios-8/" (Published Sep. 23, 2014).
Sunil, "blog.gsmarena.com/dropbox-for-android-updated-with-new-notification-feed-and-paymentoptions-for-pro-users/" (Published Nov. 20, 2013).
Ben Lovejoy, -.w,1w.rnacrurno1•s.co:n/2013!02i15/clropbox-tor-!os-aQQ-gains-QuSIHwttications-forshared-folde,s-new-Qdf-viewe11 (Published Feb. 15, 2013).
support.box.com/hc/en-us/articles/200864518-Step-5-Adjust-Your-Notifications (Published Dec. 15, 2014).

* cited by examiner

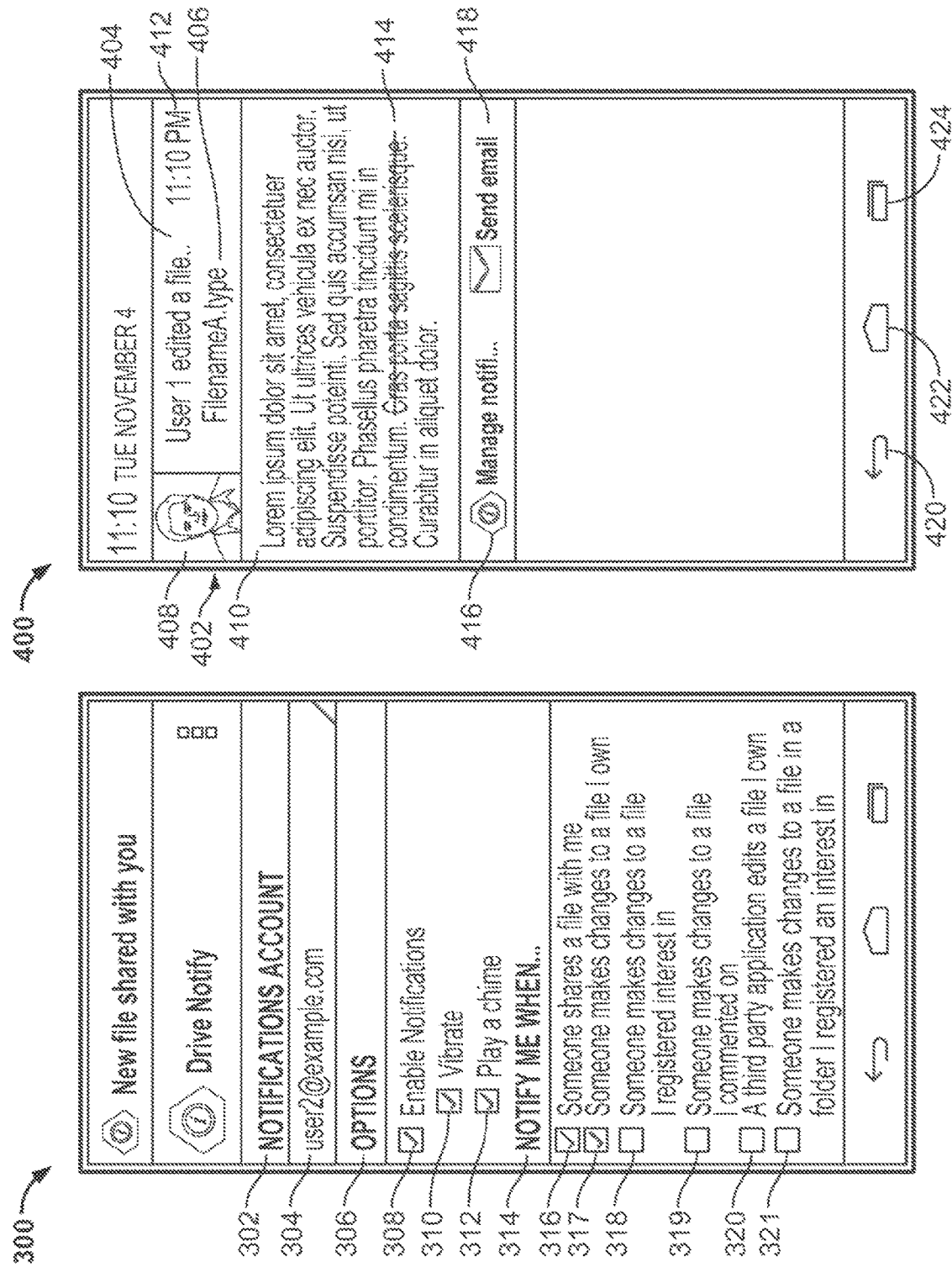

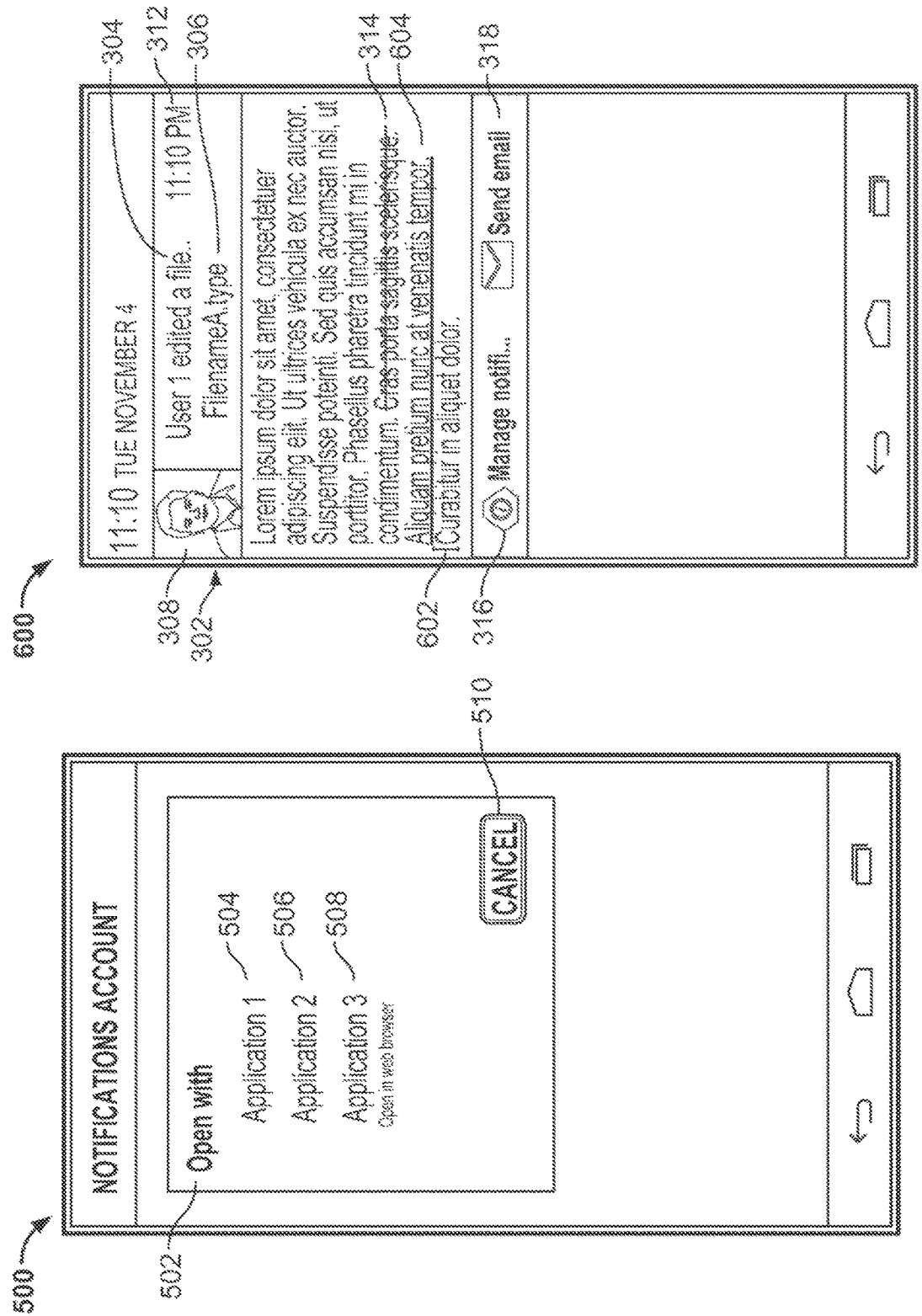

SYSTEMS AND METHODS FOR NOTIFYING USERS OF CHANGES TO FILES IN CLOUD-BASED FILE-STORAGE SYSTEMS

RELATED APPLICATIONS

This application is a continuation application of co-pending U.S. patent application Ser. No. 16/512,352, filed Jul. 15, 2019, which is continuation application of U.S. patent application Ser. No. 14/688,848, filed Apr. 16, 2015, now U.S. Pat. No. 10,356,157, each of which is incorporated herein by reference.

FIELD OF THE INVENTION

In general, this disclosure relates to notifying a user of a change to a file stored in a cloud-based file-storage system.

BACKGROUND

Users continue to rapidly adopt cloud-based computing services, including file-storage services with built-in file sharing and collaborative abilities. Concurrently, mobile devices are seeing large-scale adoption, and cloud-based storage services are becoming available on mobile platforms. Increasingly, users access content in cloud-based storage from their mobile device. However, there is a need for systems which notify users on their mobile devices of changes to their files stored in cloud-based file-storage systems. Currently, users must manually launch an application on their mobile devices to view and respond to changes made to their files in cloud-based file-storage systems. This makes it difficult for users to rapidly detect changes to their files by collaborators or to respond to those changes in a timely fashion. These limitations make it difficult for users to collaborate on urgent projects when they only have access to mobile devices (e.g., when they are travelling).

SUMMARY

Systems and methods are disclosed herein for notifications for files stored in cloud-based file-storage systems. One aspect relates to notifying a user of a change to a file stored in a cloud-based file-storage system. A first indication of a first change to the file by a first user is received from a remote server, where the file is associated with a second user and is stored by the remote server. Subscription preferences of the second user are received. A notification indicating the first change to the file is displayed on a mobile device associated with the second user if a category of the notification is allowed by the subscription preferences. The notification includes a graphical preview of the file, an identifier of the file, and an identity of the first user.

Another aspect relates to a system for notifying a user of a change to a file stored in a cloud-based file-storage system. The system includes circuitry configured to receive from a remote server a first indication of a first change to the file by a first user, wherein the file is associated with a second user and is stored by a remote server. The circuitry is also configured to receive subscription preferences of the second user, and display, by a mobile device associated with the second user, a notification indicating the first change to the file if a category of the notification is allowed by the subscription preferences. The notification includes a graphical preview of the file, an identifier of the file, and an identity of the first user.

In some embodiments, the graphical preview includes a portion of the file that is affected by the first change. In certain embodiments, the graphical preview emphasizes a portion of the file that is affected by the first change. The notification may include action buttons that allow the second user to perform actions in response to the notification. The action buttons may include a button for contacting the first user. A local application may be called on the mobile device to handle the file responsive to a selection of one of the action buttons. Handling the file may include at least one of opening the file, viewing the file, and editing the file. In some embodiments, a local email application is called on the mobile device responsive to a selection of the button to contact the first user, and an email addressed to an email address of the first user is automatically generated with the local email application. Contact information of the first user may be retrieved from an address book stored in the mobile device. In certain embodiments, a phone number of the first user based is retrieved based on the identity of the first user included in the notification, and in response to a selection of the button for contacting the first user, a text message is addressed to the phone number of the first user. In certain embodiments, a second indication of a second change to the file is received from the remote server, and the first and second changes are grouped in response to determining that the first and second changes are related so that the notification indicates the grouped first and second changes.

In some embodiments, the first change includes granting the second user access to the file. The action buttons may include an action button for updating the subscription preferences of the second user. The subscription preferences may include at least one of an activity type, an identity of a monitored file, an identity of a monitored folder, and an identity of a user of interest. In certain embodiments, contact information of the first user is retrieved from an address book stored in the mobile device. In some embodiments, the notification further includes an image of the first user, a type of the file, a description of the file, a size of the file, an open URL associated with the file, a time of the first change, a type of the first change, or an identifier of the owner of the file.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 3 is a diagram of a display of a user interface that displays a user's subscription preferences for receiving notifications regarding changes to files stored in a cloud-based file storage system, according to an illustrative embodiment.

FIG. 4 is a diagram of a display of a user interface that notifies a user of a change to a file stored in a cloud-based file storage system, according to an illustrative embodiment.

FIG. 5 is a diagram of a display of a user interface that allows a user to choose how to interact with a file associated with a notification, according to an illustrative embodiment.

FIG. 6 is a diagram of a display of a user interface that allows a user to edit a file associated with a notification by interacting with the notification without opening the file, according to an illustrative embodiment.

DETAILED DESCRIPTION

Figure 1:
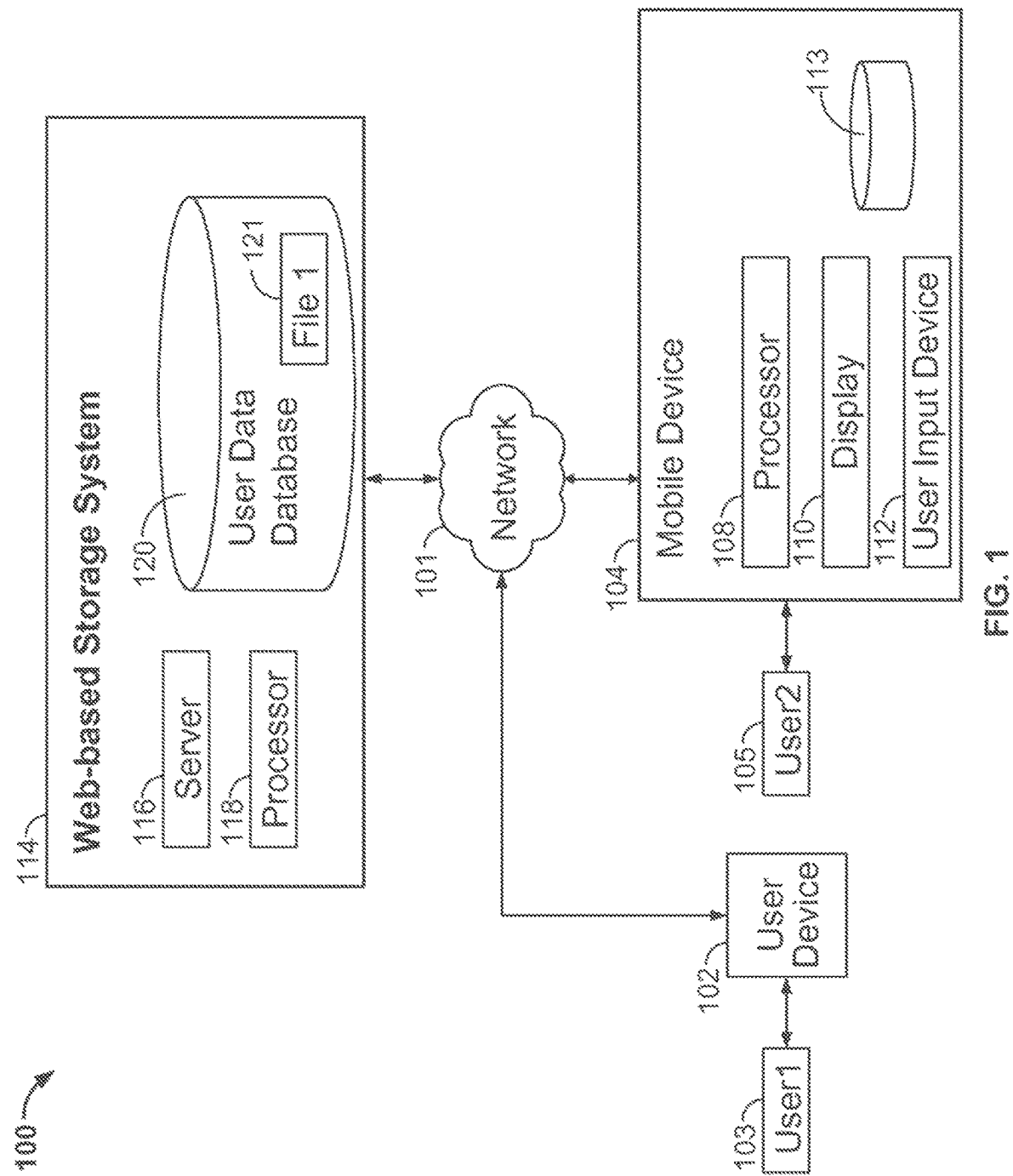
FIG. 1 is a block diagram of a computerized system for notifying a user of a change to a file stored in a cloud-based file-storage system, according to an illustrative embodiment.

To provide an overall understanding of the disclosure, certain illustrative embodiments will now be described, including a system for providing notifications of changes to files stored on a cloud-based file-storage system. In particular, systems and methods are described that allow for notifying a user of a change to a file stored in a cloud-based file-storage system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for notifying a user of a change to a file stored in a cloud-based file-storage system. The systems and methods described herein allow timely, meaningful, and actionable notifications of changes to files. The systems and methods also allow a user to control the types of notifications that the user receives using subscription preferences. The notifications described herein are file-centric because they notify a user of actions and activities that relate to files. While this description focuses primarily on a mobile device use case, the systems and methods described herein are directly applicable to any platform associated with notifications. The systems and methods described herein are described in terms of a web-based storage system, which may communicate with other systems over a network to store and share user data. In general, one of ordinary skill in the art will understand that the systems and methods described herein are applicable to systems that are locally interconnected without departing from the scope thereof.

The systems and methods described herein allow a user to be notified of a change made to a file in a cloud-based file-storage system without requiring the user to manually launch an application and manually check for changes. Instead, the systems and methods allow for a process to run in the background of a mobile device to check for a change to file. When a change is detected, the process can notify the user of the change. Not only is a user notified of the change, but details of the change are also provided. The details may include, for example, an identifier of the user responsible for the change, relevant metadata (e.g., an identifier of the changed file, a title, an icon, an open URL, a file type, a description, a file size), or a graphical preview of the changed file. In this way, a user does not have to launch a separate user interface to see the details of the change. Furthermore, the notification may include action buttons which allow actions to be taken in response to the notification. For example, the user may be able to edit the file (e.g., enter or delete text from the file) directly from a graphical preview provided with the notification without manually launching a separate application. This allows a user to rapidly detect, interpret, and respond to changes to files without having to launch additional user interfaces.

In some embodiments, the notification includes an email option which allows the user to email the editor responsible for a change. In such cases, the email may be automatically addressed to the editor, and the subject line of the email may be prepopulated with a description of the file. The automatic addressing and prepopulation of the email may make communication with the editor more rapid and convenient, thereby facilitating collaboration on urgent projects. In some embodiments, a user may use the notification to contact the editor through other modes of communication. For example, the notification may include an option which allows the user to initiate a text message, videoconference, or phone call to the editor. This can provide a method of communication even faster and more direct than email for especially urgent projects. The above features also facilitate collaboration with users who are out of their offices or travelling, especially when working on time-sensitive projects. These advantages and others will be more apparent upon consideration of the following detailed description.

FIG. 1 depicts an example of a network and database structure that may be used to implement the systems and methods described herein. FIG. 1 is a block diagram of a computerized system 100 for allowing file-centric notifications. The system 100 includes a web-based storage system 114, a user device 102, and a mobile device 104, all configured to communicate over a network 101. A first user 103 is associated with the user device 102 and a second user 105 is associated with the mobile device 104. The first user 103 may be the owner or in physical possession of the user device 102. Similarly, the second user 105 may be the owner or in physical possession of the mobile device 104. The web-based storage system 114 includes a server 116, a processor 118, and a user data database 120. The mobile device 104 includes a processor 108, a display 110, a user input device 112, and database for storing subscriptions preferences 113. The user device 102 and mobile device 104 may each be a smartphone, a tablet, a wearable computing device, a laptop, a desktop, or any other suitable computing device.

As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one web-based storage system 114 and only two devices 102 and 104 are shown in FIG. 1 to avoid complicating the drawing. In general, the system 100 can support multiple web-based storage systems and any number of user devices and mobile devices.

The web-based storage system 114 is a file hosting system that allows users to store, retrieve, and modify data. This data may be referred to as a user's web data, which is stored in the user data database 120. The server 116, the processor 118, or both may perform functions related to maintaining the user data database 120, such as allocating memory for the data, receiving new data to be stored in the database, deleting data in the database, or any other suitable function related to database maintenance. The web-based storage system 114 may be stored on a single server system or in a distributed system. In particular, the web-based storage system 114 may use cloud storage to store user data.

The user data database 120 of the web storage system 114 includes a file 121 which is associated with the second user 105. Specifically, in the example of FIG. 1, the file 121 is owned by the second user 105. In some embodiments the file 121 is associated with the second user 105 because the second user 105 has registered an interest in the file (e.g., subscribed to the files), has commented on the file, has been granted access to the file, has previously had access to the file, or for any other suitable reason. The first user 103 may interact with the file 121 through the user device 102. The first user 103 may interact with the file 121 by sharing the file 121 (with the second user 105 or with another user), by editing the file 121 (directly or by a third-party application), by commenting on the file 121, by deleting the file 121, by performing a workflow operation on the file 121 (e.g., process approval), by adding a new revision to the file 121, by replying to a comment associated with the file 121, or by any other suitable action related to changing the content or the metadata associated with the file 121.

After the first user 103 acts on the file 121, the change is logged by the web-based storage system 114. An indication of the action of the first user 103 (e.g., a change event) is sent to the mobile device 104 over the network 101. The indication can be sent by the web-based storage system 114 immediately after the change is detected (e.g., a push architecture) or in response to a periodic polling call by the mobile device 104 (e.g., a polling architecture). If a polling architecture is used, changes may be queried by the mobile device 104 in regular intervals (e.g., 1 s, 10 s, 30 s, 1 min, 5 min, 30 min, 1 hr, 1 day, or any other suitable interval) and related changes may be batched, grouped, combined, coalesced, or otherwise aggregated into a combined notification. Related changes may be actions taken on the same file, actions taken by the same editor, or actions that are closely grouped temporally (e.g., within 1 s, 2 s, 5 s, 10 s, 1 min, 5 min, 10 min, 1 hour or any other suitable timeframe). Indications may be sent to the second user 105 in response to actions by actors other than the first user 103 (e.g., another user, a third-party application, or any other entity that may have access to the file 121).

After the mobile device 104 receives an indication of a change from the web-based storage system 114, the mobile device 104 uses the subscription preferences 113 to determine whether the change is in a category in which the second user 105 registered an interest. If the subscription preferences 113 indicate that the second user 105 is interested in receiving a notification regarding the change, a notification is generated and presented on the display 110 of the mobile device 104. The second user 105 can view the notification, act on the notification, update his or her subscription preferences 113, or perform any other suitable operation in response to receiving the notification.

In some embodiments, the web-based storage system 114 determines whether a change matches the second user's subscription preferences before sending an indication of a change. In such cases, the subscription preferences of the second user 105 may be stored in the user data database 120 or in a separate database accessible by 114. If a detected change does not match any category registered in the subscription preferences, the web-based storage system 114 will not send a change indication to the mobile device 104.

Figure 2:
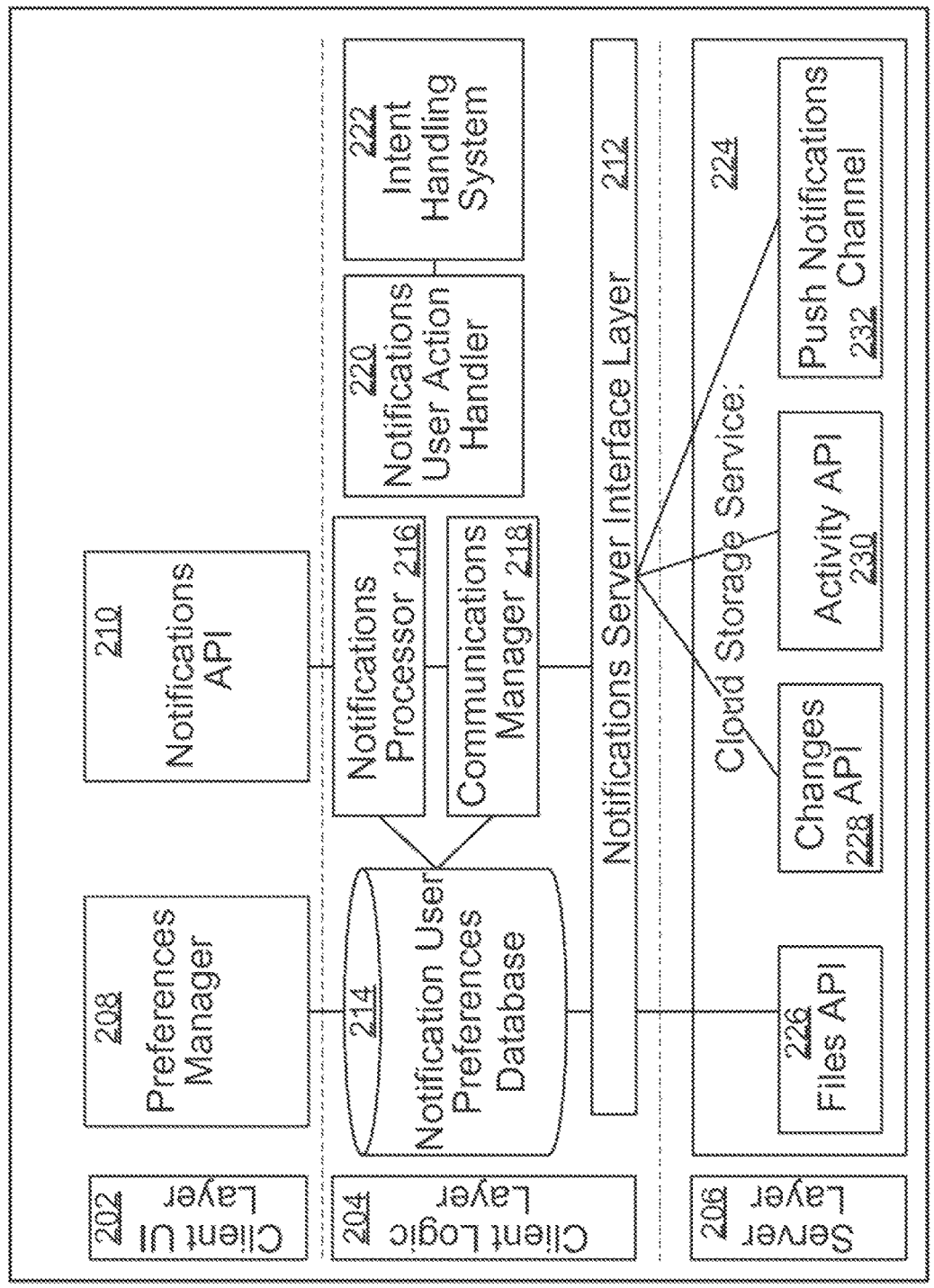
FIG. 2 is a diagram of a system architecture for notifying a user of a change to a file stored in a cloud-based file-storage system, according to an illustrative embodiment.

FIG. 2 is a diagram of a system architecture 200 for notifying a user of a change to a file stored in a cloud-based file-storage system, according to an illustrative embodiment. The architecture 200 may be used for the system 100 of FIG. 1. The architecture 200 includes three layers: a client user interface (UI) layer 202, a client logic layer 204, and a server layer 206. The client UI layer 202 includes a preferences manager 208, and a notifications application programming interface (API) 210. The client device may be the mobile device 104 of FIG. 1. The client logic layer 204 includes a notifications server interface layer 212, a notification user preferences database 214, a notifications processor 216, a communications manager 218, a notifications user action handler 220, and an intent handling system 222. The client logic layer 204 is responsible for storing user preferences, receiving change events, processing change events, aggregating change events, initiating the display of notifications, and appropriately routing user interactions with the notifications. The server layer 206 includes a cloud storage service 224 having a push notifications channel 232 and several APIs: a files API 226, a changes API 228, and an activity API 230. It will be appreciated that, in some implementations, the server layer may include any suitable number of APIs. The server layer 206 is responsible for receiving, processing, and returning programmatic queries issued by components in the client logic layer 204.

Generally, the architecture 200 operates in three phases: a preferences display phase, a notification detection phase, and a notification display phase. In the preferences display phase, the user's preferences are solicited and recorded by the preferences manager 208. The preferences manager 208 is configured to display a list of notification options and to receive an indication of the types or categories of notifications which the user wishes to receive. An example user interface for the preferences manager 208 is shown and described in relation to FIG. 3. Using the preferences manager 208, users can elect to be notified, for example, when a file is shared with them, a file they own is edited, a file they own is shared with someone else (e.g., access escalation), a file they own is commented on, a file which they have previously edited is edited, deleted, shared, or commented on, their access to a file is removed, certain workflow operations have been performed on a file (e.g., process approval), a third-party application makes an edit to a file they own or have registered an interest in, a new revision is added to a file they own or have registered an interest in, a file they own or have expressed interest in has been commented on, a specific comment which they left in a file has been replied to, or any other suitable event related to a file. After receiving the preferences, the preferences manager 208 stores the user's preferences in the notifications user preferences database 214. The user preferences may also be stored in the cloud storage service 224 by the files API 226. In some embodiments, the list of available notification options (including those not currently selected by the user) are defined in the cloud storage service 224 and are received therefrom by the preferences manager 208.

In the notification detection phase, notification data is received, processed, and acted on. The notification detection phase may be executed primarily by the communications manager 218. The communications manager 218 may be a process that runs substantially continually in the background on the client device (e.g., the mobile device 104). The communications manager 218 receives change events (e.g., an indication of a change to a file) from one of the APIs (e.g., the changes API 228). The change events may be received in response to periodic polling of the APIs (e.g., a polling architecture) or may be received in a pushed data payload from the cloud storage service 224, via a special socket connection (e.g., a push architecture).

In embodiments using a polling architecture, the communications manager 218 may operate as a background thread and periodically conduct a polling loop. During the polling loops, the communications manager 218 queries for change events (e.g., potential notifications), reconciles any change events with user preferences, and sends any allowed notifications for display. Allowed notifications are notifications that are permitted by the user preferences. Thus, the collection and processing of change events is performed periodically. The period may be fixed or may vary (e.g., based on server load). Generally, the period may be chosen to reduce notification latency (e.g., time between the occurring event and notification of the event to the user), while maintaining an acceptably low load on the server of the cloud storage service 224.

In embodiments using a push architecture, the communications manager 218 may establish a long-running push notifications channel 232 with the cloud storage service 224. Data may be sent directly from the cloud storage service 224 to the client over the push notifications channel 232, which may obviate the need for the communications manager 218 to poll. In such an architecture, the cloud storage service 224 can send change events to the client as they occur. Since change events may generally be rarer than a polling interval, the direct transmission of change events may reduce client-server traffic as well as client battery usage and mobile network data usage. In some embodiments, additional information for the file (e.g., activity information) is included in the payload sent from the cloud storage service 224 to the communications manager 218. In such cases, the communications manager 218 may not need to call the activity API 230 for additional information related to the changed file.

After receiving a change event (or group of change events), the communications manager 218 reconciles the change event with user preferences by calling logic stored in the notifications processor 216. The communications manager 218 then queries the notifications processor 216 to batch, group, combine, coalesce, or otherwise aggregate multiple changes to the same file to prevent duplicate or similar notifications. As needed, and if directed by the notifications processor 216, the communications manager 218 calls the APIs again (e.g., the activity API 230) for additional details on a specific file associated with a notification. The additional details may include the user who last edited the file, the specific changes that were made, or any other suitable information regarding the file. Afterwards, the communications manager 218 prepares the notification which includes a client notification payload containing information required for the display. The client notification payload is defined by the notifications API 210 that may be local to the client. The client notification payload includes metadata associated with the file. Metadata may be a set of data that describes and gives information about other data. Metadata for a given file may be distinguished from the content of the file. For example, the content of a text file may be the text stored therein, while the metadata may include the file name, file size, file type, date of last modification, date of creation, name of the file owner, or similar information. In some embodiments, the client notification payload includes a primary description, a secondary description, an image, actions, callbacks, or any other suitable metadata associated with the file.

After the notification payload is prepared, the communications manager 218 calls the notifications processor 216 to initiate display of the notification. As discussed above, the notifications processor 216 is responsible for batching, grouping, combining, coalescing, or otherwise aggregating multiple duplicate or similar notifications. In some embodiments, when multiple editors change the same file owned by the current user, the notifications processor 216 combines these notifications to display a single combined notification to the user (assuming the notifications are allowed by the user preferences). For example, when four users edit the same file, a combined notification may be displayed with the primary description "User A and three others edited <FileName>."

The notification display phase begins when the notifications API 210 on the client receives a call from the notifications processor 216. In response to the call, the notifications API 210 displays the notification to the user. The mechanics and the appearance of the notification may vary from platform to platform, as each platform's user interface for notifications may vary. A platform may be any environment in which a piece of software is designed to operate. A platform may include a hardware architecture, an operating system (OS), or runtime libraries. Platforms compatible with the systems and methods described herein include local operating systems, mobile devices (e.g., smartphones or tablets), web-based operating systems, wearable electronic devices (e.g., glasses or watches), and any other suitable platforms. The notification display phase can interface with various different platforms via their respective notifications APIs. Therefore, the notification systems and methods described herein are not tied to a particular platform, but are instead configured to operate across platforms (e.g., for cross-platform notifications). In some embodiments, the notifications appear in a non-obtrusive way, such as in a notifications bar at the top of a display without interfering with the remainder of the display. In such cases, the user can retrieve additional details by interacting with (e.g., swiping, sliding, dragging, or pressing) the notification.

The notification display phase may also include allowing a user to take a range of actions on or in response to the notification. For example, the user may interact with the file associated with the notification, contact the user responsible for the notification (e.g., the editor), update the subscription preferences stored in the database 214, dismiss the notification, or take any other suitable action. These actions are discussed further in relation to FIG. 9. Whatever action the user selects, the user action handler 220 handles the action. Handling may include interpreting the action or executing a callback function. If the file associated with the notification is to be opened, the intent handling system 222 is invoked. The intent handling system 222 is configured to perform inter-process operations, such as opening the file with a native application on the client or opening a local email application to email an editor of the file.

If the received user action relates to opening the file associated with the notification, the file may be opened in one of a variety of ways. In some embodiments, a single application previously designated for the file's file type is invoked to allow full editing of the file. In certain embodiments, a plurality of local applications on the client system that are registered to handle the file (e.g., third-party applications) are displayed, and a user selects a single application to use to open the file. In some embodiments, a generic built-in previewer application is invoked that may handle multiple file types, such as documents, spreadsheets, and slide presentations, to provide a read-only view of the file. In certain embodiments, the file is opened in a web-based view (e.g., non-natively), which may be in a web-browser, as if it were being accessed from a desktop computer over the web.

FIG. 3 is a diagram of a display of an exemplary user interface 300 that displays a user's subscription preferences for receiving notifications regarding changes to files stored in a cloud-based file storage system. Before receiving a notification, a user may be required to register for (e.g., subscribe to) one or more categories of notifications using the user interface 300. The user interface 300 may be displayed to the second user 105 of FIG. 1 by the display 110 of the mobile device 104. The user interface 300 includes a notifications account section 302, the selected notifications account field 304, an options section 306, a vibrate option 310, a chime option 312, a notification category section 314, and notification options 316-321. In the notifications account section 302, the user indicates the notification account for which they wish to set subscription preferences. The notification system allows the user to manage multiple user accounts so that a user can specify different preferences for different accounts. The selected user account is displayed in the selected notifications account field 304. In some embodiments, the user has the option to configure automatic synchronization of the subscription preferences with the subscription preferences of another device associated with the selected user account.

The enable notifications option 308 in the options section 306 allows the user to select whether notifications are to be enabled at all. If notifications are enabled, the user can choose what types of notification mechanisms are included with the notification. For example, the vibrate option 310 and chime option 312 enable a vibration or an audible chime, respectively, to accompany the notification. In some embodiments, a user can select a light (e.g., an LED on the mobile device) or another type of sound to accompany the notification. The user may also select the visual appearance of the notification that is displayed. For example, the user may choose for the notification to appear as a pop-up, a badge, or a banner. A pop-up may require the user to take an action or dismiss the notification before continuing to use the client device. A banner may allow the user to continue to use the client device while the notification is displayed and may dismiss automatically. A badge may be a notification that is overlaid over an icon for a particular application (e.g., on a home screen of a client device). A notification may also appear on a dedicated notification pane or notification center on the client device.

The notification category section 314 allows a user to select the types of notifications which the user wishes to receive. The options 316-321 allow notifications to be generated when someone shares a file with the user, when changes are made to a file owned by the user, when changes are made to a file that the user has registered an interest in, when changes are made to a file that the user commented on, when a third-party application edits a file owned by the user, or when changes are made to a file in a folder that the user registered an interest in, respectively. While only options 316-321 are shown in FIG. 3, more options, fewer options, or different options may be presented to the user in other embodiments. For example, in some embodiments, the user interface 300 also allows a user to mute or suppress notification for certain files designated by the user. In this way, the user does not receive notifications about certain specified files. In certain embodiments, a user may suppress all notification except for a specifically enumerated list of files. In this way, the user only receives notifications about the certain specified files. The embodiments described above may also allow subscriptions preferences to refer to entire folders in addition to or instead of specific files. For example, a user may mute or suppress notifications about any files in a specified folder or set of folders, or only permit notifications if they are about a file in a specified folder or set of folders. Furthermore, in some embodiments, the user interface 300 allows the user to mute or suppress notifications related to an action performed by a certain user or list of users. Similarly, in certain embodiments, the user interface 300 allows the user to only receive notifications related to an action performed by a certain user or list of users. Any of the above criteria can be combined. For example, the user can use the user interface 300 to register for notifications about any files in folders A, B, or C, except from users D, E, or F. The different subscription options give the user a high degree of control over the display of notifications. Blocking notifications related to certain files, folders, or users can reduce the number of unwanted notifications that the user receives. Allowing a user to receive notifications related to files or folders in which a user has registered an interest allows the user to monitor important changes to files that may not be owned by the user. This can facilitate tracking changes to a file that a user is collaborating on, but does not own.

FIG. 4 is a diagram of a display of an exemplary user interface 400 that notifies a user of a change to a file stored in a cloud-based file storage system. The user interface 400 may be displayed on the mobile device 104 of FIG. 1. The user interface 400 notifies the second user 105 of FIG. 1 that the first user 103 has edited a file owned by the second user 105. The user interface 400 includes a notification 402 having a primary description 404, a secondary description 406, an image 408, a graphical preview 410, a time 412, and action buttons 416 and 418. The primary description 404 indicates the type of action that triggered the notification and the identifier of the user that performed the action. In the example of FIG. 4, the primary description 404 indicates that User 1 (e.g., the first user 103 in FIG. 1) edited a file. The secondary description 406 indicates the file on which the action was performed. In this case, "FileNameA.type" is the affected file. The image 408 indicates the user that performed the action. In this case, the image 408 is a photo or graphical indicator of the first user. In some embodiments, interacting with the image 408 allows the user to contact the user who performed the action. For example, the second user may click on the image 408 to view the first user's contact information. This contact information can be retrieved from the second user's address book. The second user may contact the first user by an email, text message, videoconference, or call to a phone number or other address associated with the first user, or by any other suitable communication. The contact information of the first user may be retrieved from an address book stored on the client device. This feature enables rapid and direct communication between users to discuss a change to a file. This rapid and direct communication can be helpful for urgent projects. Furthermore, a phone call can be useful for some projects when a comment cannot be expressed in writing.

The graphical preview 410 shows a portion of the file that has been affected by a change made by the first user. In some implementations, the graphical preview displays a canonical thumbnail image associated with the file. A canonical thumbnail image may be unique for each document. For example, the canonical image may be the first page of a document or an image file, or a key frame in a video. The graphical preview 410 may exclude portions of the file, such as a portion of the file that is unaffected by the change. The graphical preview may also emphasize portions of the file that have been affected by the change. In the example of FIG. 4, the change is the deletion of text and is indicated by the change indicator 414. The user can open the file by selecting (e.g., pressing or clicking) the graphical preview 410. A user may be presented with a list of programs which may be selected to handle (e.g., open, view, edit, render) the file. In some embodiments, the user may interact directly with the graphical preview 410 to edit the file without having to open the file. The interactions may include options to zoom and pan images; playback video; or page through paginated content (e.g., multipage PDFs or documents). This will be discussed in relation to FIG. 6.

The action buttons 416 and 418 included in the user interface 400 allow the user to take actions in response to the notification. The action button 416 allows a user to update his or her subscription preferences. Selecting the action button 416 may open the user interface 300 shown in FIG. 3 so that the user can change his or her preferences, which may have been previously selected by the user or set to default settings. The action button 418 allows the second user to send an email in response to the notification. In particular, the action button 418 generates an email from the second user addressed to the first user. The recipient and the subject may be automatically populated based on information from the notification. An example email that may be generated in response to selecting the action button 418 is shown in FIG. 7.

FIG. 5 is a diagram of a display of an exemplary user interface 500 that allows a user to choose how to interact with a file associated with a notification. The user interface 500 may be displayed in response to receiving a selection of the graphical preview 410 in FIG. 4 to open the file named "FileNameA.type." The user interface 500 includes a prompt 502, a cancel option 510, and labels 504-506 corresponding to application 1, application 2, and application 3, respectively. Although three applications are shown in the user interface 500, any suitable number of applications may be displayed. The prompt 502 prompts the user to open the file with one of the three applications. Each of the three shown applications has been registered as capable of opening the type of file selected. The type of file may be determined from the file extension (e.g., ".type" in this example) of the file. One or more of the applications may be configured only to view the type of file while others may be configured to view and edit the type of file. The applications may be native applications, third-party applications, or web-based applications. A native application may be an application that has been developed for use on a particular platform or device. The label for the third application 506 includes the secondary description "open in web browser" because application 3 is a web-based application. Accordingly, selecting application 3 will launch a web browser that displays the web-based application.

FIG. 6 is a diagram of a display of an exemplary user interface 600 that allows a user to edit a file associated with a notification by interacting with the notification 402 without opening the file. The user interface 600 is similar to the user interface 400 of FIG. 4 and may also be displayed on the mobile device 104 of FIG. 1. As in the user interface 400, the user interface 600 includes a notification 402 having a primary description 404, a secondary description 406, an image 408, a graphical preview 410, a time 412, and action buttons 416 and 418. The notification 402 notifies the second user of a change made to a file ("FileNameA.type") by the first user. The graphical preview 410 shows a portion of the file that has been affected by a change made by the first user. In particular, the graphical preview 410 displays a portion of the file that was edited by the first user and excludes various other portions of the file (e.g., other paragraphs) that were not changed. The graphical preview 410 includes a first change indicator 414 (e.g., strikethrough formatting) that indicates the change made by the first user, a second change indicator 604 (e.g., underline formatting) that indicates a change made by the second user, and a cursor 602 that indicates the current point of insertion of new text. In this example, the first user deleted a sentence as indicated by the first change indicator 414. In response to the notification, the second user inserted new text as indicated by the second change indicator 604. The presence of the cursor 602 indicates that the second user can continue to enter new text into the window of the graphical preview 410. The new text indicated by the second change indicator 604 was entered using the notification without opening the file FileNameA.type in a separate window. In some embodiments, the notification communicates in the background of the client device with an application configured to edit the file. While still being displayed, the notification may pass the user's input to the application configured to edit the file by an inter-process communication (e.g., using a signal, socket, message queue, pipe, shared memory, message passing, or a memory-mapped file shared between processes). In addition to text entry, other edits may be made to the file from the preview, such as renaming the file, moving the file location, copying the file, deleting the file, sharing the file, commenting on the file, editing multiple portions through the file, or any other suitable operation. In some embodiments, a context sensitive menu (e.g., a right click menu) can be displayed that presents operations that can be performed on the file. Such a feature allows file management directly from the notification. Although in-preview editing is discussed above, it will be appreciated that, in some embodiments, the file may not be editable from the graphical preview 410. In such cases, the user may still be allowed to interact with the graphical preview 410. For example, the graphical preview 410 may allow the user to pan, scroll, or zoom to change the view of the file being previewed. Similarly, the graphical preview 410 may also allow playback for video files, advancing slides for a presentation, or scrolling for a file with paginated content (e.g., a PDF). In still other embodiments, the graphical preview may be a read-only thumbnail associated with the file, such as a canonical image.

Figure 7:
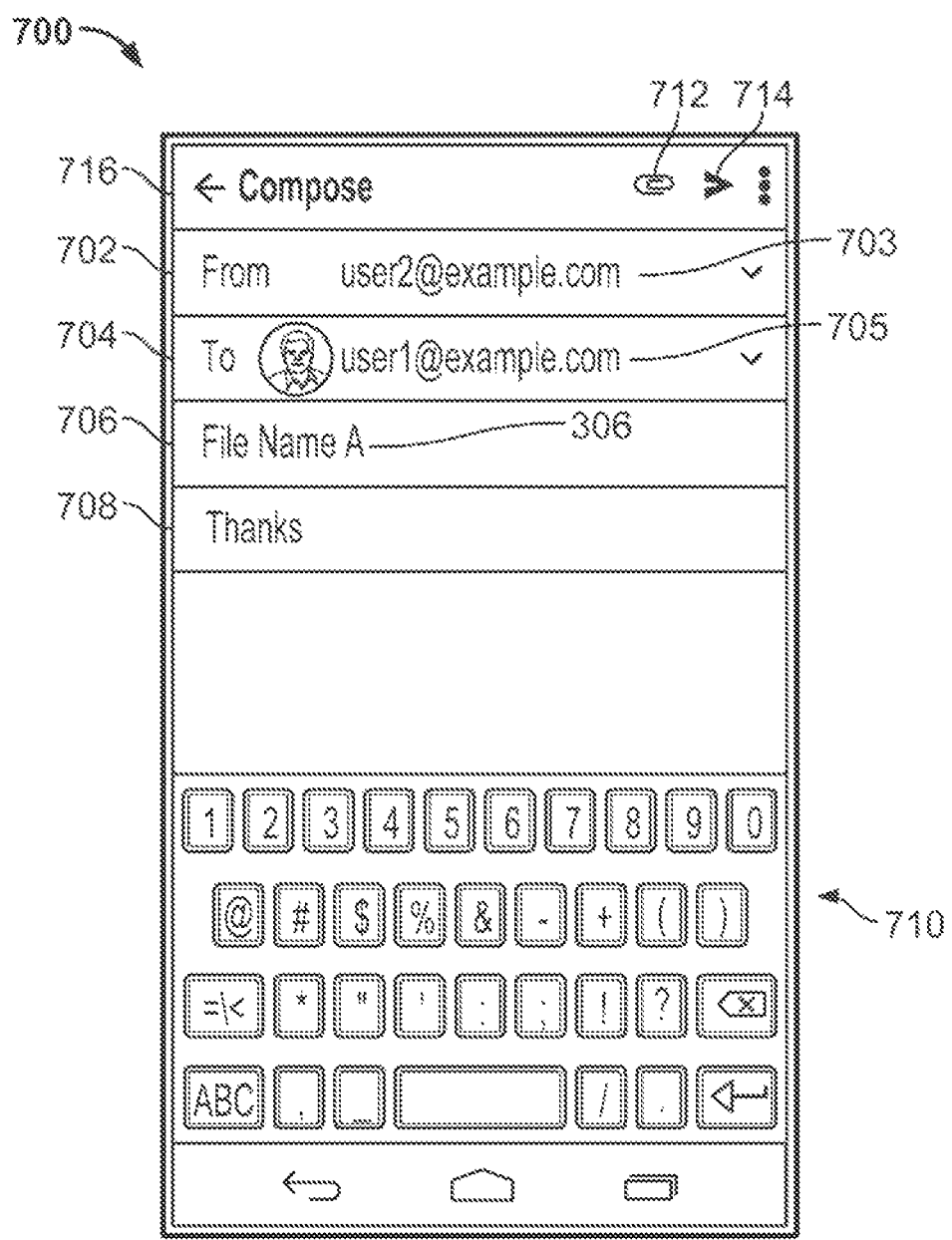
FIG. 7 is a diagram of a display of a user interface that generates an email addressed to an editor of a file stored in a cloud-based file storage system, according to an illustrative embodiment.

FIG. 7 is a diagram of an exemplary display of a user interface 700 that generates an email addressed to an editor of a file stored in a cloud-based file storage system. The user interface 700 may be displayed in response to the selection of the email action button 418 in the user interface 400 of FIG. 4. The user interface 700 includes a sender field 702, a recipient field 704, a subject line 706, a body field 708, a keyboard 710, an attachment button 712, a send button 714, and a return button 716. The user interface 700 may be the user interface of a local email application of the mobile device 104 of FIG. 1. The recipient field 704 is automatically filled with the email address 705 of the first user ("user1@example.com") because the first user performed the change corresponding to the notification. The subject line 706 is also automatically filled with the primary description 406 of the changed file. The automatic filling or prepopulation of the recipient field 704 and subject line 406 allow the second user to quickly respond to the editor (the first user) in response to the change. This allows comments to be provided in a timely fashion. In some embodiments, when more than one sender email address is available, the sender field 702 is automatically filled with the email address 703 associated with the changed file. After the prepopulated data has been added, the second user can enter a comment or other message in the body field 708 using the keyboard 710 before sending the message to the first user. The second user can also edit any of the information that was added automatically. For example, the second user can choose to add more information to the subject line 706 or add additional recipients to the recipient field 704. The second user can also add an attachment using the attachment button 712. In some embodiments, the changed file or a link thereto is automatically attached to the email. Once the email is drafted, the second user sends the email by selecting the send button 714. The prepopulation of the recipient field 704 and subject line 406 can make communication between editors more rapid and convenient, thereby facilitating collaboration on urgent projects. Furthermore, additional recipients who are not editors of the file may be copied on the email to the first user. This allows a user to copy additional recipients (e.g., a project manager) for comments regarding changes that are especially important (e.g., deletions or insertions of large amounts of text) and to copy fewer recipients when changes are less important (e.g., correcting typographical errors). This targeted approach to commenting can reduce the number of unwanted emails received by team members that are tangentially involved in collaboration. This can also allow additional users to be involved in the editing process without having to make them editors of the file.

Figure 8:
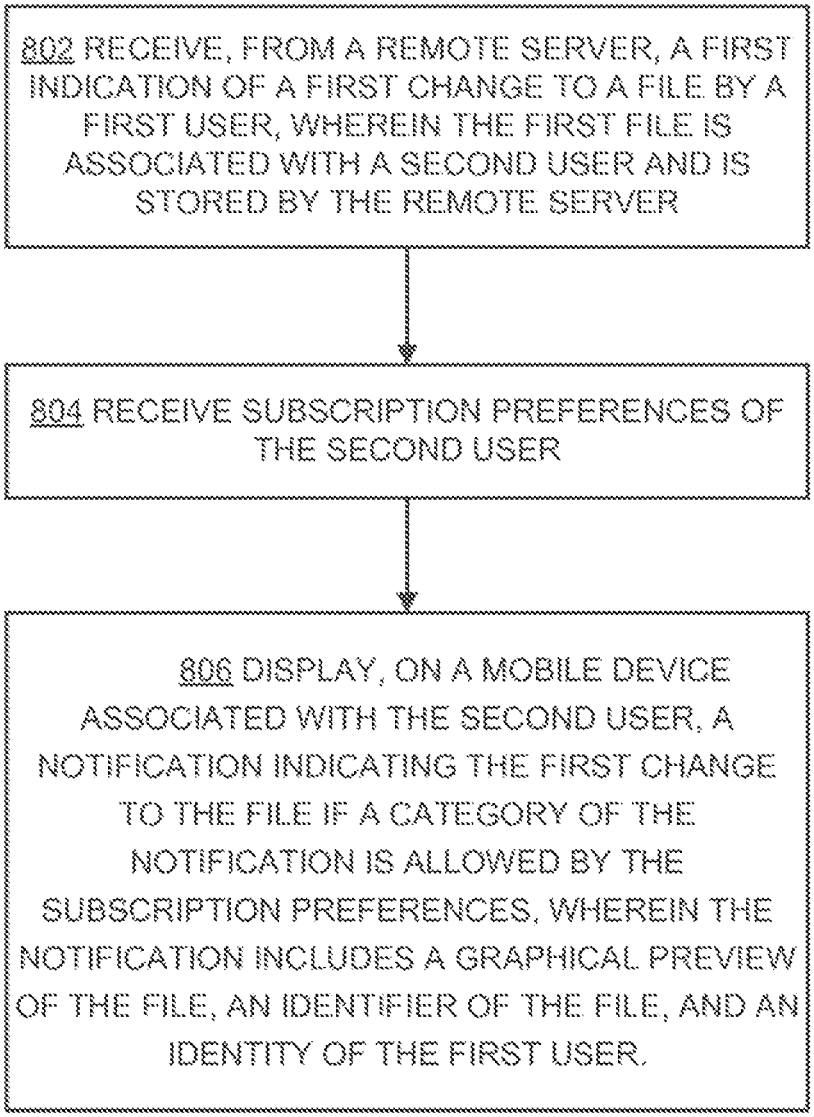
FIG. 8 is a flow chart of an illustrative method for notifying a user of a change to a file stored in a cloud-based file-storage system, according to an illustrative embodiment.

FIG. 8 is a flow chart of an illustrative method 800 for notifying a user of a change to a file stored in a cloud-based file-storage system. The method 800 may be performed using the system 100, architecture 200, user interfaces 300, 400, 500, 600, or 700 discussed in FIGS. 1-7, respectively, or any suitable combination thereof. In step 802, a first indication of a first change to a file by a first user is received from a remote server. The file is associated with a second user and is stored by the remote server. The first indication of the first change may be sent by the web-based storage system 114 of FIG. 1 to the mobile device 104 over the network 101. The first indication may be received in response to a call to the changes API 228 of the cloud storage service 224 of FIG. 2 or from a payload sent over the push notifications channel 232.

In step 804, subscription preferences of the second user are received. The subscription preferences may be received using the preferences manager 208 of FIG. 2, the user interface 300 of FIG. 3, or any other suitable means. In some embodiments, the subscription preferences include at least one of an activity type, an identity of a monitored file, an identity of a monitored folder, and an identity of a user of interest. The subscription preferences may also include various sections, such as a notifications account section, a global notification options section, and a notification category section. The notifications account section may allow the user to indicate the notification account for which they wish to set subscription preferences. In some embodiments, the notification system allows the user to manage multiple user accounts so that a user can specify different preferences for different accounts. In some embodiments, the user has the option to configure automatic synchronization of the subscription preferences with the subscription preferences of another device associated with the selected user account. The global notification options section may allow the user to select whether notifications are to be enabled at all. If notifications are enabled, the global notification option setting may allow the users to choose which notification mechanisms are included with the notification. For example, a user may choose a vibration or a chime to accompany the notification. The user may also select the visual appearance of the notification that is displayed. For example, the user may choose for the notification to appear as a pop-up, a badge, or a banner. A pop-up may require the user to take an action or dismiss the notification before continuing to use the client device. A banner may allow the user to continue to use the client device while the notification is displayed and may dismiss automatically. A badge may be a notification that is overlaid over an icon for a particular application (e.g., on a home screen of a client device). A notification may also appear on a dedicated notification pane or notification center on the client device. The notification category section may allow a user to select the types of notifications which the user wishes to receive. The options in such a section may allow notifications to be generated when someone shares a file with the user, when changes are made to a file owned by the user, when changes are made to a file that the user has registered an interest in, when changes are made to a file that the user commented on, when a third-party application edits a file owned by the user, or when changes are made to a file in a folder that the user registered an interest in. A user may also be permitted to mute or suppress notification for certain files designated by the user. In this way, the user does not receive notifications about certain specified files. In certain embodiments, a user may suppress all notification except for a specifically enumerated list of files. In this way, the user only receives notifications about the certain specified files. The embodiments described above may also allow subscriptions preferences to refer to entire folders in addition to or instead of specific files. For example, a user may mute or suppress notifications about any files in a specified folder or set of folders, or only permit notifications if they are about a file in a specified folder or set of folders. Furthermore, in some embodiments, the user may mute or suppress notifications related to an action performed by a certain user or list of users. Similarly, in certain embodiments, the user may choose to only allow notifications related to an action performed by a certain user or list of users. Any of the above criteria can be combined. For example, the user can register for notifications about any files in folders A, B, or C, except from users D, E, or F. These different subscription options give the user a high degree of control over the display of notifications. Blocking notifications related to certain files, folders, or users can reduce the number of unwanted notifications that the user receives. Allowing a user to receive notifications related to files or folders in which a user has registered an interest allows the user to monitor important changes to files that may not be owned by the user. This can facilitate tracking changes to a file that a user is collaborating on, but does not own.

In step 806, a notification indicating the first change to the file is displayed on a mobile device associated with the second user if a category of the notification is allowed by the subscription preferences. The notification includes a graphical preview of the file, an identifier of the file, and an identity of the first user. The graphical preview may exclude a portion of the file that is unaffected by a change. The notification may be displayed on the mobile device using an API (e.g., the notifications API 210 of FIG. 2) or using any other suitable means. In some embodiments, the notifications are displayed on a desktop computer, a laptop computer, or any other suitable computing device. The notification may appear similar to the notification 402 of FIGS. 4 and 6.

In some embodiments, a determination of whether the notification is allowed by the subscription preferences is performed by a communications manager, such as communications manager 218 of FIG. 2, or by any other suitable means. In certain embodiments, a plurality of indications of changes are batched, grouped, combined, coalesced, or otherwise aggregated into a single notification before display to prevent duplicate or similar notifications. Displaying the notification may include generating a notification payload including a primary description, a secondary description, an image, possible user actions, or any other suitable information. In some embodiments, the possible user actions include options to update the subscription preferences, contact the user responsible for the change, open the file in a separate program, or edit the file within the notification.

Figure 9:
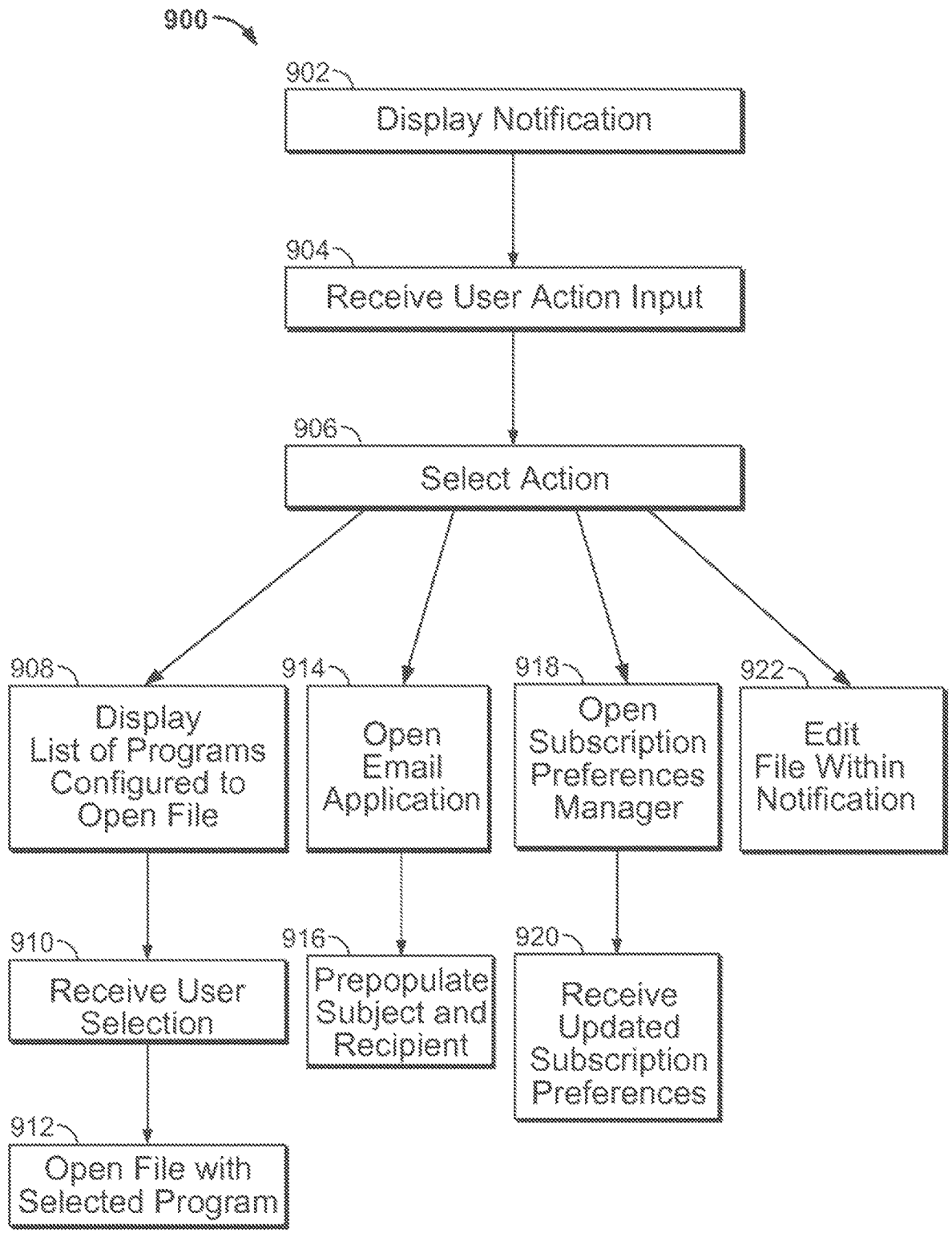
FIG. 9 is a flow chart of an illustrative method for taking an action in response to a user action input associated with a notification, according to an illustrative embodiment.

FIG. 9 is a flow chart of an illustrative method 900 for taking an action in response to a user action input associated with a notification. The method 900 may be performed using the system 100, architecture 200, user interfaces 300, 400, 500, 600, or 700 discussed in FIGS. 1-7, respectively, or any suitable combination thereof. In step 902, a notification is displayed. The notification provides a user with multiple options for taking an action in response to the notification. In the method 900, the actions available for selection include opening the file associated with the notification, sending an email, updating subscription preferences, and editing the file within the notification. Although method 900 includes four options, any suitable number of options are available in other embodiments.

step 904, a user action input is received. The user action input is a selection of an action from the multiple options provided. In response to the selection, an action is selected in step 906. The possible actions include opening the file, emailing the user responsible for the change, or updating the subscription preferences. In some embodiments, the possible actions also include dismissing the notification, contacting the user responsible for the change by other modes of communication (e.g., text message, phone call, or videoconference), or any other suitable action, or combination thereof.

If, at step 906, the user chooses to open the file, a list of programs configured to open the file is displayed in step 908. In some embodiments, the intention to open the file is determined in response to receiving a selection of a graphical preview of the file. The list of programs may be displayed using a user interface, such as the user interface 500 of FIG. 5. Any suitable number of programs may be displayed. Each of the displayed programs may have been registered as capable of opening the file's file type. The type of file may be determined from the file's file extension. One or more of the applications may be configured only to view the file type while others may be configured to view and edit the file type. The programs may be native applications, third-party applications, or web-based applications. A native application may be an application that has been developed for use on a particular platform or device. In step 910, a user selection of a program from the list of programs is received. In step 912, the file is opened with the selected program. If the selected application is a web-based application, a web browser is launched to display the web-based application.

If, at step 906, the user instead chooses to send an email, a local email application is opened in step 914. A user interface of a local email application can be displayed, such as the user interface 700 of FIG. 7. A new email is generated that may include a sender field, a recipient field, a subject line, a body field, and an attachment field. Subsequently, in step 916, the subject and the recipient of the email are prepopulated. The recipient field may be automatically filled with the email address the user responsible for the change. The subject line may be automatically filled with the primary description of the changed file. The automatic filling or prepopulation of the recipient field and subject line allow the second user to quickly respond to an editor in response to the change. This allows comments to be provided in a timely fashion. In some embodiments, when more than one sender email address is available, the sender field is automatically filled with the email address associated with the changed file. After the prepopulated data has been added, the second user can enter a comment or other message in the body field before sending the message. The second user can also edit any of the information that was added automatically. For example, the second user can choose to add more information to the subject line or add additional recipients to the recipient field. The second user can also add an attachment. In some embodiments, the changed file or a link thereto is automatically attached to the email. The prepopulation of the recipient field and subject line can make communication between editors more rapid and convenient, thereby facilitating collaboration on urgent projects. Furthermore, additional recipients who are not editors of the file may be copied on the email to the editor. This allows a user to copy additional recipients (e.g., a project manager) for changes that are especially important (e.g., deletions or insertions of large amounts of text) and to copy fewer recipients when changes are less important (e.g., correcting typographical errors). This targeted approach to commenting can reduce the number of unwanted emails received by team members that are tangentially involved in collaboration. This can also allow additional users to be involved in the editing process without having to make them editors of the file.

If, at step 906, the user chooses to update the subscription preferences, a subscriptions preferences manager is opened in step 918. The subscription preferences manager may be the preferences manager 208 of FIG. 2 and may display the user interface 300 of FIG. 3. In some embodiments, the subscription preferences include at least one of an activity type, an identity of a monitored file, an identity of a monitored folder, and an identity of a user of interest. Subsequently, in step 920, updated subscription preferences are received and stored.

If, at step 906, the user chooses to edit the file, the file can be edited from within the notification in step 922. In such cases, the file is edited directly from the notification without opening the file in a separate application. The editing operation can be performed using a user interface, such as the user interface 600 of FIG. 6. The editing may be performed in a graphical preview included in the notification. The graphical preview may show a portion of the file that has been affected by a change and may exclude various other portions of the file that were not changed. A cursor may be displayed in the graphical preview that indicates the current point of insertion of new text. New text or data may be added without opening the file in a separate window. To this end, the notification may communicate with an application configured to edit the file in the background of a client device. While still being displayed, the notification may pass the user's input to the application configured to edit the file by an inter-process communication (e.g., using a signal, socket, message queue, pipe, shared memory, message passing, or a memory-mapped file shared between processes). This allows the second user to quickly and conveniently edit the file from the notification itself or to quickly comment on changes shortly after they are made. The edits may include renaming the file, moving the file location, copying the file, deleting the file, or any other suitable operation. In some embodiments, a context sensitive menu (e.g., a right click menu) can be displayed that presents operations that can be performed on the file. Such a feature allows file management directly from the notification.

Figure 10:
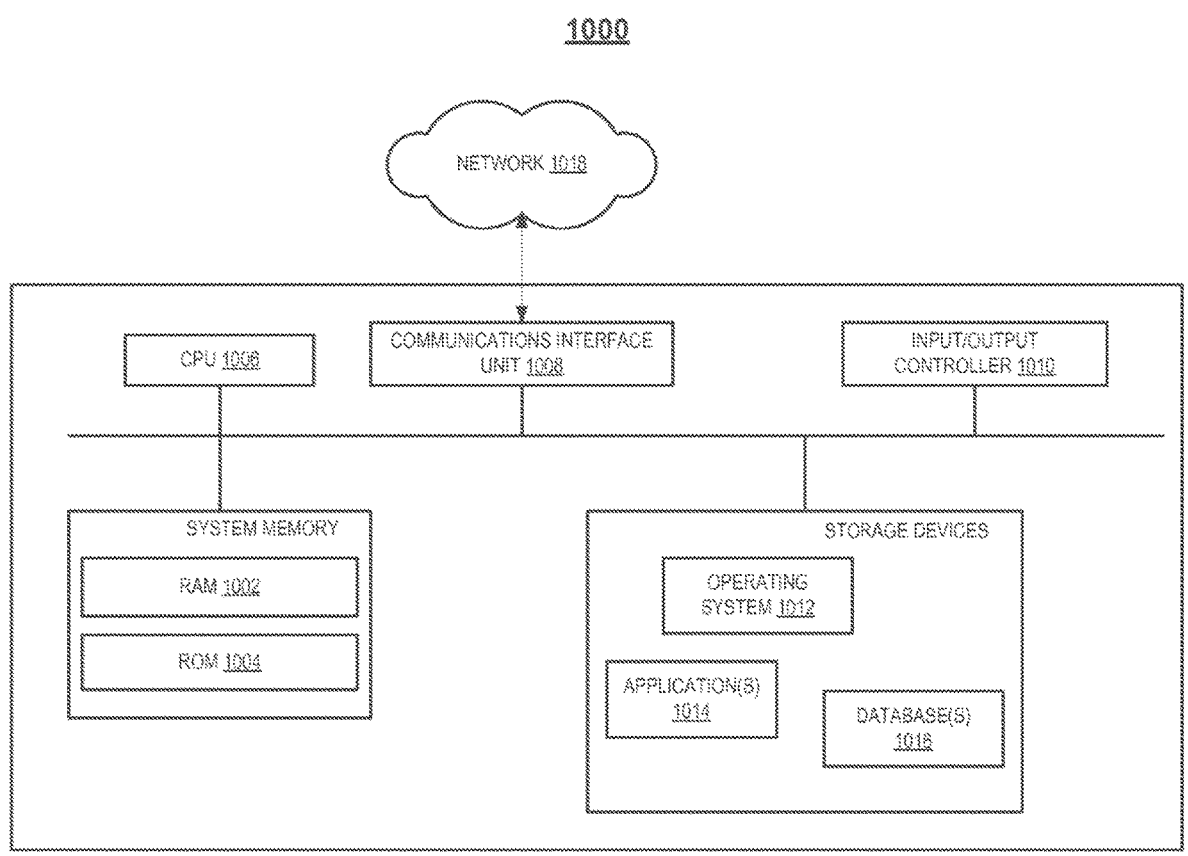
FIG. 10 is a block diagram of a computing device for performing any of the processes described herein, according to an illustrative embodiment.

FIG. 10 is a block diagram of a computing device, such as any of the components of the system of FIG. 1, for performing any of the processes described herein. Each of the components of these systems may be implemented on one or more computing devices 1000. In certain aspects, a plurality of the components of these systems may be included within one computing device 1000. In certain implementations, a component and a storage device may be implemented across several computing devices 1000.

The computing device 1000 comprises at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. In FIG. 10, the computing device 1000 is linked, via network or local network, to other servers or systems.

The computing device 1000 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1008 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 comprises a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may comprise an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes described herein. The program also may include program elements such as an operating system 1012, a database management system and "device drivers" that allow the processor to interface with computer peripheral devices (e.g., a video display, a keyboard, or a computer mouse) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method to provide a service to facilitate notifications of changes to a plurality of files located in a plurality of folders in a cloud-based storage system, the method comprising:
   exposing, by the service, an application programming interface (API) to obtain a plurality of folder subscription data of a plurality of users of a plurality of client devices for individual folders of the plurality of folders in the cloud-based storage system;
   receiving, via the API of the service and from a first client device of the plurality of client devices, folder subscription data identifying a subscribed folder individually selected for subscription by a first user of the first client device of the plurality of client devices to receive notifications of changes to one or more files located in the subscribed folder,
      wherein the subscribed folder individually selected for subscription by the first user is one of the plurality of folders, and the one or more files in the subscribed folder individually selected for subscription by the first user are a subset of the plurality of files of different file types associated with different file editing applications independent of the service, the different file types comprising two or more of a document type, a spreadsheet type or a slide presentation type;
   storing, in a data store, the folder subscription data identifying the subscribed folder individually selected for subscription by the first user in association with a user account of the first user to enable monitoring of changes to the one or more files in the subscribed folder individually selected for subscription by the first user for the user account of the first user of the first client device; and
   providing, to the first client device, updates pertaining to the changes to the one or more files in the subscribed folder individually selected for subscription by the first user to cause the first user to be notified about the changes to the one or more files in the subscribed folder individually selected for subscription by the first user, wherein the updates are provided in accordance with the folder subscription data associated with the user account of the first user, and wherein the changes comprise changes made to the one or more files in the subscribed folder individually selected for subscription by the first user by users of the cloud-based storage system other than the first user.

2. The method of claim 1, wherein the folder subscription data associated with the user account of the first user further comprises at least one of an activity type, an identity of a monitored file, or an identity of the first user.

3. The method of claim 1, wherein providing, to the first client device, updates pertaining to the changes to the one or more files in the subscribed folder comprises:
   providing a first indication of a first change to a first file of the one or more files in the subscribed folder to cause the first user to be notified about the first change to the first file using a notification comprising a graphical preview of the first file, an identifier of the first file, and an identity of a second user that performed the first change to the first file.

4. The method of claim 3, wherein the graphical preview includes a portion of the first file that is affected by the first change.

5. The method of claim 3, wherein the notification includes action buttons that allow the first user to perform actions in response to the notification.

6. The method of claim 5, wherein one of the file editing applications is to be called to handle the first file responsive to a selection of one of the action buttons.

7. The method of claim 6, wherein handling the first file includes at least one of opening the first file, viewing the first file, sharing the first file, or editing the first file.

8. A system to provide a service to facilitate notifications of changes to a plurality of files located in a plurality of folders in a cloud-based storage system, the system comprising:
   a memory; and
   a processing device, coupled to the memory, to perform operations comprising:
      exposing, by the service, an application programming interface (API) to obtain a plurality of folder subscription data of a plurality of users of a plurality of client devices for individual folders of the plurality of folders in the cloud-based storage system;
      receiving, via the API of the service and from a first client device of the plurality of client devices, folder subscription data identifying a subscribed folder individually selected for subscription by a first user of the first client device of the plurality of client devices to receive notifications of changes to one or more files located in the subscribed folder,
         wherein the subscribed folder individually selected for subscription by the first user is one of the plurality of folders, and the one or more files in the subscribed folder individually selected for subscription by the first user are a subset of the plurality of files of different file types associated with different file editing applications independent of the service, the different file types comprising two or more of a document type, a spreadsheet type or a slide presentation type;
      storing, in a data store, the folder subscription data identifying the subscribed folder individually selected for subscription by the first user in association with a user account of the first user to enable monitoring of changes to the one or more files in the subscribed folder individually selected for subscription by the first user for the user account of the first user of the first client device; and
      providing, to the first client device, updates pertaining to the changes to the one or more files in the subscribed folder individually selected for subscription by the first user to cause the first user to be notified about the changes to the one or more files in the subscribed folder individually selected for subscription by the first user, wherein the updates are provided in accordance with the folder subscription data associated with the user account of the first user, and wherein the changes comprise changes made to the one or more files in the subscribed folder individually selected for subscription by the first user by users of the cloud-based storage system other than the first user.

9. The system of claim 8, wherein the folder subscription data associated with the user account of the first user further comprises at least one of an activity type, an identity of a monitored file, or an identity of the first user.

10. The system of claim 8, wherein providing, to the first client device, updates pertaining to the changes to the one or more files in the subscribed folder comprises:
providing a first indication of a first change to a first file of the one or more files in the subscribed folder to cause the first user to be notified about the first change to the first file using a notification comprising a graphical preview of the first file, an identifier of the first file, and an identity of a second user that performed the first change to the first file.

11. The system of claim 10, wherein the graphical preview includes a portion of the first file that is affected by the first change.

12. The system of claim 10, wherein the notification includes action buttons that allow the first user to perform actions in response to the notification.

13. The system of claim 12, wherein one of the file editing applications is to be called to handle the first file responsive to a selection of one of the action buttons.

14. The system of claim 13, wherein handling the first file includes at least one of opening the first file, viewing the first file, sharing the first file, or editing the first file.

15. A non-transitory computer readable medium storing instructions, which when executed by a processing device, cause the processing device to perform operations to provide a service to facilitate notifications of changes to a plurality of files located in a plurality of folders in a cloud-based storage system, the operations comprising:
exposing, by the service, an application programming interface (API) to obtain a plurality of folder subscription data of a plurality of users of a plurality of client devices for individual folders of the plurality of folders in the cloud-based storage system;
receiving, via the API of the service and from a first client device of the plurality of client devices, folder subscription data identifying a subscribed folder individually selected for subscription by a first user of the first client device of the plurality of client devices to receive notifications of changes to one or more files located in the subscribed folder,
wherein the subscribed folder individually selected for subscription by the first user is one of the plurality of folders, and the one or more files in the subscribed folder individually selected for subscription by the first user are a subset of the plurality of files of different file types associated with different file editing applications independent of the service, the different file types comprising two or more of a document type, a spreadsheet type or a slide presentation type;
storing, in a data store, the folder subscription data identifying the subscribed folder individually selected for subscription by the first user in association with a user account of the first user to enable monitoring of changes to the one or more files in the subscribed folder individually selected for subscription by the first user for the user account of the first user of the first client device; and
providing, to the first client device, updates pertaining to the changes to the one or more files in the subscribed folder individually selected for subscription by the first user to cause the first user to be notified about the changes to the one or more files in the subscribed folder individually selected for subscription by the first user, wherein the updates are provided in accordance with the folder subscription data associated with the user account of the first user, and wherein the changes comprise changes made to the one or more files in the subscribed folder individually selected for subscription by the first user by users of the cloud-based storage system other than the first user.

16. The non-transitory computer readable medium of claim 15, wherein the folder subscription data associated with the user account of the first user further comprises at least one of an activity type, an identity of a monitored file, or an identity of the first user.

17. The non-transitory computer readable medium of claim 15, wherein providing, to the first client device, updates pertaining to the changes to the one or more files in the subscribed folder comprises:
providing a first indication of a first change to a first file of the one or more files in the subscribed folder to cause the first user to be notified about the first change to the first file using a notification comprising a graphical preview of the first file, an identifier of the first file, and an identity of a second user that performed the first change to the first file.

18. The non-transitory computer readable medium of claim 17, wherein the graphical preview includes a portion of the first file that is affected by the first change.

19. The non-transitory computer readable medium of claim 18, wherein the notification includes action buttons that allow the first user to perform actions in response to the notification.

20. The non-transitory computer readable medium of claim 19, wherein one of the file editing applications is to be called to handle the first file responsive to a selection of one of the action buttons.

* * * * *